United States Patent [19]

Stanisic et al.

[11] 4,417,951
[45] Nov. 29, 1983

[54] DISTILLER AND EVAPORATOR FOR SEA WATER

[76] Inventors: Jovo Stanisic, c/o George Spector, 3615 Woolworth Bldg., 233 Broadway; George Spector, 3615 Woolworth Bldg., 233 Broadway, both of New York, N.Y. 10007

[21] Appl. No.: 203,063

[22] Filed: Nov. 3, 1980

[51] Int. Cl.³ .............................................. C02F 1/04
[52] U.S. Cl. .................................. 202/197; 55/186; 122/492; 202/176; 203/1; 203/2; 203/10; 203/40; 159/DIG. 26
[58] Field of Search ................... 203/40, 1, 2, 99, 100, 203/10, 11; 202/197, 176, 234; 55/185, 186; 159/27 A, DIG. 26, DIG. 1; 122/492

[56] References Cited

U.S. PATENT DOCUMENTS

| | | | |
|---|---|---|---|
| 700,374 | 5/1902 | Roake | 202/185 D |
| 1,223,101 | 4/1917 | Pacziga | 55/186 |
| 1,511,854 | 10/1924 | Waters | 55/186 |
| 1,588,861 | 6/1926 | Walker | 55/186 |
| 1,724,537 | 8/1929 | Waters | 55/186 |
| 1,770,773 | 7/1930 | Hackett | 55/186 |
| 1,826,428 | 10/1931 | Miller | 203/99 |
| 1,936,964 | 11/1933 | Gensecke | 202/197 |
| 2,201,961 | 5/1940 | Stoltz | 202/197 |
| 2,904,509 | 9/1959 | Helmers | 203/99 |
| 3,020,215 | 2/1962 | Weber | 202/197 |
| 3,279,533 | 10/1966 | Kersteter et al. | 202/197 |
| 3,532,606 | 10/1970 | Sibert | 203/1 |
| 3,694,321 | 9/1972 | Marovich et al. | 202/197 |

Primary Examiner—Wilbur L. Bascomb, Jr.

[57] ABSTRACT

An apparatus for the distilling and evaporating of sea water so to produce pure fresh water on a large production basis; the apparatus including an evaporator having a baffle system of novel design therein so as to separate evaporated steam from non-evaporated water drops, a duct for conveying the evaporated steam to a condenser and a pure water supply tank; the evaporator being supplied by sea water.

2 Claims, 6 Drawing Figures

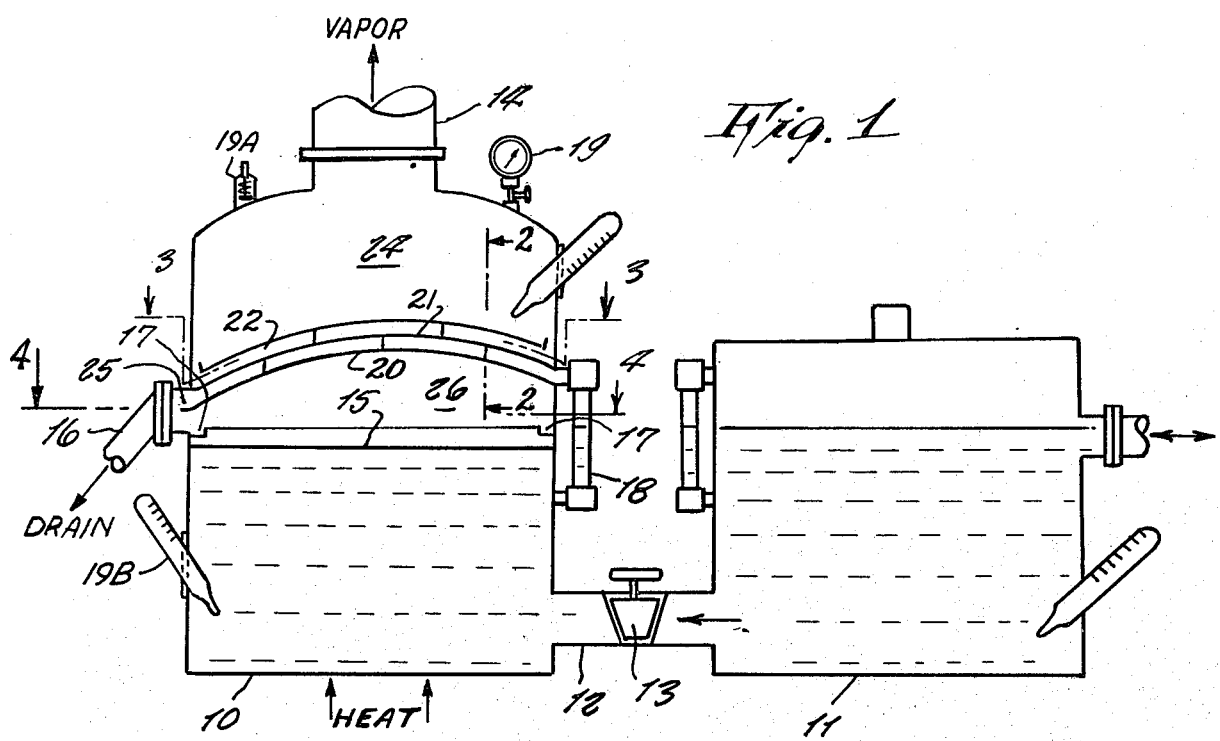

DISTILLER AND EVAPORATOR FOR SEA WATER

This invention relates generally to equipment for the distillation and evaporation of sea water.

It is well known that with increasing population there is an increasing consumption of drinking water, and with a greater industrialization, there is a larger amount of pure water required in various enlarged and new phases of manufacturing production. Accordingly, there is becoming a more need to find other sources of pure water than is presently being obtained from lakes, rivers and the like, particularly in view that more and more of it is becoming polluted due to chemicals of industry and waste of modern living being dumped therein, destroying the natural purity of such water bodies. It is, therefore, natural that attention is now being given to obtain pure, fresh water out of salty sea water so to meet the present day requirements. In some countries fresh water is rationed particularly in dry or hot seasons.

Accordingly, it is a principal object of the present invention to provide an improved distiller and evaporator for converting sea water to pure fresh water.

Another object is to provide a distiller and evaporator for sea water which in one particular design can be used aboard a ship wherein at this time there is a great waste of heat by the exhaust gases of the large engines passing out of the ship funnel and into the atmosphere, and wherein this wasted heat in the funnel can be harnessed to produce all of the ship's requirement of fresh water during an ocean voyage, without any additional expense. The sea water used to cool the engines can be used as it is already pre-heated 40 to 45 degrees centigrade, so it is ready for evaporation.

Other objects are to provide a distiller and evaporator for sea water which is simple in design, inexpensive to manufacture, rugged in construction, easy to use and efficient in operation.

These and other objects will be readily evident upon a study of the following specification and the accompanying drawing wherein FIG. 1 is a diagrammatic side view of a system of the present invention.

FIG. 2 is an enlarged detail in cross section of the interior baffle construction of the invention, taken along section 2—2 of FIG. 1.

FIG. 3 is a top view of the baffle construction inside the evaporator, as viewed in direction 3—3 of FIG. 1.

FIG. 4 is a cross sectional view on line 4—4 of FIG. 1.

FIG. 5 is an enlarged cross sectional view on line 5—5 of FIG. 4, showing a peripheral drainage canal.

FIG. 6 is a modification of the invention showing a cross section through a modified diffuser.

The present invention is shown in FIG. 1 to include an evaporator 10 and a sea water supply water tank 11 which are interconnected by a supply pipe 12 having a supply valve 13, which is automatically regulated by the water level within the evaporator. The top of the evaporator is connected with a condenser (not shown) by a pipe 14 for conducting evaporated steam into the condenser where a vacuum is obtained by vacuum ejectors, (not shown). Condensed water from a condensed suction pump (not shown) takes water and discharges it in drinking water tanks (not shown). A drain pipe (not shown) in the bottom of the evaporator periodically drains water from the evaporator when it becomes heavily saturated with brine. Another drainpipe 16 with a collection canal 17 in a ring plate 15 collects non-evaporated brine water droplets.

The evaporator is provided with a water level gauge 18, vacuum gauge 19, a manometer 19A and a salinometer.

In the evaporator, the steam space 24 is installed with baffles 20, 21 and 22, for the evaporated steam. The purpose of the baffles is to separate evaporated steam from non-evaporated water drops which are not as jet-pure as distilled steam. Each baffle 20 and 21 as shown in FIG. 2, has openings 23 of diffuser shape. Such diffuser-shaped openings accelarate the separation of saturated steam. The last component baffle 22 forms a last barrier for non-evaporated water drops and for distilled steam before entering steam space 24. The baffle surface is equal in area to the inside transverse area of the evaporator, and is arcuate for more effective separation of distilled steam. The lowermost baffle 20 has the largest surface, and on its peripheral edge has a collecting vault 25 in which non-evaporated water drops collect and are conveyed to the drain canal 17 in ring plate 15. Evaporated steam from area 26 passes through the diffuser shaped openings 23 and then impinge on the second component baffle 21 while changing course and being partly divested of water drops. After going through the openings 23 of the second baffle 21 pure steam and non-evaporated water drops are separated, the pure steam then leaving steam space 24 through outlet pipe 14 to the condenser.

Two or more baffles in a same evaporator may be employed, as may be required for maximum effect.

In FIG. 6, a modified design of diffuser opening 23 is provided by a diffuser 30 of Venturi shape with electric contacts 31 and 32 on opposite sides so that large water drops entering the same will close an electric circuit that will thus cause a spark that will vaporize the water drop. Thus preventing water drop passage therethrough. Contact 31 is stationary while contact 32 is slidable closer thereto where steam pressure inside area 26 is increased, at which time there are larger concentration of water drops so that they must be vaporized. This is accomplished by a hollow accordian shaped, expandable case 33 interconnected to area 26, and which pushes a pivotable lever 34 connected to slide 35 which carries contact 32.

While various changes may be made in the detail construction, it is understood that such changes will be within the spirit and scope of the present invention as is defined by the appended claims.

The following is claimed:

1. A Sea water distiller comprising a sea water supply tank connected by a conduit to the bottom of an evaporator with heating means, including a ring plate mounted around the inside periphery of said evaporator at a predetermined level, said ring plate including a peripheral drainage canal in combination with a plurality of spaced vertically curvate baffles above said plate, the lowermost of said baffles having a peripheral edge positioned above and laterally adjacent said canal whereby moisture is directed and drained from said baffle to said canal, in further combination with a drainage pipe having an inlet in communication with said canal for drainage purposes, said baffles having upward oriented diffusers and an upper solid baffle superimposed over said baffles with the diffusers, said upper baffle having an outer edge spaced from evaporator inner surface whereby deflected steam vapor is directed peripherally to the said edge and to a steam space above said upper baffle, including a steam outlet above said steam space wherein said diffusers including means for variably restricting water drops from passing therethrough comprising a Venturi section in said diffusers with electrical means in the Venturi section for vaporizing water drops upon contact of said electrical means with water drops.

2. A distiller as in claim 1 wherein said electrical means include electric contacts, variably spaced responsive to steam pressure.

* * * * *